United States Patent [19]

Westphal et al.

[11] 3,996,311

[45] * Dec. 7, 1976

[54] GRAFT POLYBUTADIENE-STYRENE INTERPOLYMERS AND PROCESS FOR MAKING SAME

[75] Inventors: Richard C. Westphal, Leominster; Paul Heinig, Bolton, both of Mass.

[73] Assignee: Foster Grant Co., Inc., Leominster, Mass.

[ * ] Notice: The portion of the term of this patent subsequent to Feb. 25, 1992, has been disclaimed.

[22] Filed: Feb. 24, 1975

[21] Appl. No.: 552,385

Related U.S. Application Data

[63] Continuation-in-part of Ser. No. 194,021, Oct. 29, 1971, abandoned, and a continuation-in-part of Ser. No. 640,478, May 23, 1967, Pat. No. 3,868,434, which is a continuation-in-part of Ser. No. 457,794, May 21, 1965, abandoned, which is a continuation-in-part of Ser. No. 155,200, Nov. 27, 1961, abandoned, which is a continuation-in-part of Ser. No. 759,145, Sept. 5, 1958, abandoned.

[52] U.S. Cl. .......................................... 260/880 R
[51] Int. Cl.² .......................................... C08L 9/06
[58] Field of Search .................... 260/876 R, 880 R

[56] References Cited

UNITED STATES PATENTS

| | | | |
|---|---|---|---|
| 2,694,692 | 11/1954 | Amos | 260/880 R |
| 2,754,282 | 7/1956 | Stoops | 260/83.7 |
| 2,886,553 | 5/1959 | Stein | 260/880 R |
| 3,004,018 | 10/1961 | Naylor | 260/94.3 |
| 3,005,811 | 10/1961 | Youngman | 260/94.3 |
| 3,016,371 | 1/1962 | Natta | 260/94.3 |
| 3,032,544 | 5/1962 | Longiave | 260/94.3 |
| 3,060,989 | 10/1962 | Railsback | 152/330 |
| 3,066,128 | 11/1962 | Youngman | 260/94.3 |
| 3,094,514 | 6/1963 | Tucker | 260/94.3 |
| 3,129,199 | 4/1964 | Lunk | 260/880 R |
| 3,149,182 | 9/1964 | Porter | 260/880 R |
| 3,178,402 | 4/1965 | Smith | 260/94.2 |
| 3,230,277 | 1/1966 | Schramm | 260/880 R |
| 3,317,918 | 5/1967 | Foster | 260/83.7 |

FOREIGN PATENTS OR APPLICATIONS

| | | |
|---|---|---|
| 267,275 | 4/1957 | Australia |
| 588,825 | 2/1959 | Italy |
| 592,477 | 5/1959 | Italy |

OTHER PUBLICATIONS

G. Natta et al., La Chimica e L'industria, XLI-5-1959, pp. 398-403.

*Primary Examiner*—Paul R. Michl
*Attorney, Agent, or Firm*—Leroy G. Sinn; Joseph A. DeGrandi

[57] ABSTRACT

Graft interpolymers are provided which comprise the polymerization product of a polybutadiene having a cis butadiene content of at least 25 percent and a 1,2-addition butadiene content of not more than about ten percent and of a vinyl aromatic monomer. Processes for their production are also provided. These graft interpolymer compositions are useful in molding many consumer articles such as containers, refrigerator liners, sheet, trays, etc.

27 Claims, No Drawings

GRAFT POLYBUTADIENE-STYRENE INTERPOLYMERS AND PROCESS FOR MAKING SAME

This application is a continuation-in-part of copending U.S. application Ser. No. 194,021, now abandoned, and of copending U.S. application 640,478, now 3,868,434. Said U.S. application 194,021 is a continuation-in-part of our copending U.S. application Ser. No. 640,478 filed May 23, 1967, which is a continuation-in-part of our copending U.S. application Ser. No. 457,794, filed May 21, 1965, now abandoned, which is a continuation-in-part of application Ser. No. 155,200, filed Nov. 27, 1961, now abandoned, which in turn is a continuation-in-part of application Ser. No. 759,145, filed Sept. 5, 1958, now abandoned.

BACKGROUND OF THE INVENTION

Graft unsaturated rubbery polymer-styrene interpolymer compositions are widely used for molding, e.g., for injection molding, etc., but for many purposes are unsatisfactory because of low impact resistance and other reasons. The impact resistance of polystyrene and other vinyl aromatic polymers has been enhanced by polymerizing monomeric vinyl aromatic compounds in the presence of a rubbery material. The use of such rubbery polymers has brought about an increase in the impact properties of the vinyl aromatic materials but not to the extent that it is considered desirable for many purposes. The rubbery polymers that have been previously used in conjunction with monomeric styrene or other vinyl aromatic compounds have included natural rubber and the synthetic unsaturated rubbery polymeric derivatives of conjugated 4-6 carbon atom diolefins, as for example, GR-S and butadiene-acrylonitrile rubbery polymers. Most of such interpolymers commercialized as high impact polystyrene in the past have utilized GR-S rubbers which are also known as SBR rubbers.

Stoops et al, U.S. Pat. No. 2,754,282, filed Jan. 15, 1953 disclose polybutadiene-styrene interpolymers wherein the polybutadiene is formed by polymerizing butadiene at a temperature below about 60° C using free radical polymerization. The graph on page 343 of the standard treatise Synthetic Rubber by G. S. Whitby, John Wiley & Sons, Inc., New York, 1954, shows that a polybutadiene so formed at a polymerization temperature of 60° C has a cis content of 23.8 percent and a 1,2-addition content of 19 percent. The graph further shows that as the temperature decreases in the polymerization, the cis content and the 1,2-addition content of the resulting polybutadiene also decrease so that at a temperature of −30° C the cis content is 9 percent and the 1,2-addition content is 16.3 percent.

The lower the temperature in the polybutadiene polymerization, the more suitable is the polybutadiene for making graft polybutadiene-styrene interpolymers, as disclosed by Stoops et al at column 2, lines 41–44. Specifically, Stoops et al state that a polybutadiene produced in the polymerization at 10° C showed outstanding qualities in the polybutadienestryrene interpolymers, which polybutadiene, according to the above-referred to graph of Whitby has a cis content of 15.6 percent and a 1,2-addition content of 17.5 percent.

Stoops et al also teach that use of a polybutadiene produced by the polymerization at temperatures above 60° C results in inferior polybutadiene-styrene interpolymers. Such a polybutadiene-styrene interpolymer is disclosed in Example 6 of Amos et al, U.S. Pat. No. 2,694,692, filed Aug. 25, 1950. According to the graph on page 343 of the aforementioned Whitby publication, such a polybutadiene has a cis content of 27 percent and a 1,2-addition content of 19 percent.

Other references having a general disclosure of graft unsaturated rubbery polymer-styrene interpolymers include the following U.S. Pat. Nos.: Stein et al, 2,886,553; Baum, 2,957,833; Allen, 3,062,777; Safford et al, 3,151,184; LeFevre, 2,460,300; Popielski, 2,893,976; and Porter, 3,485,894.

The most widely commercialized interpolymer in this field has been the SBR-styrene interpolymer.

This invention relates to improved polymer compositions. In particular, it relates to compositions of vinyl aromatic polymers improved by the incorporation of rubbery polymers as to, in illustration, impact properties. More particularly, it relates to such styrene polymers including styrene interpolymer compositions having high impact strengths.

In accordance with the present invention, we have found that molding compositions of vinyl aromatic materials generally can be substantially improved for example, as regards impact resistance. This invention provides compositions comprising polymers of a monovinyl aromatic monomer, the impact values of which have been substantially enhanced by the incorporation therein of an effective amount of at least one percent by weight based on the total polymer weight of a 1,4-polybutadiene having a cis content of at least 25 percent and a vinyl or 1,2-addition butadiene content of not more than about 10 percent. Desirable polymer compositions ordinarily comprise 80–99 percent of a polymer of a monovinyl aromatic monomer and 20–1 percent total rubbery polymer, preferably 10–1 percent, said rubbery polymer comprising (a) at least 1 percent by weight of the total product of a 1,4-polybutadiene having a cis content of at least 25 percent and a vinyl or 1,2-addition content of not more than 10 percent and (b) up to 19 percent by weight of the total polymer weight of another rubbery polymer. Thus, the novel compositions can contain in some instances other rubbery polymers in place of a portion of the noted 1,4-polybutadiene, such combinations of rubbery polymers providing at times advantageous properties in the compositions.

The compositions of this invention can be prepared as by the novel free-radical polymerization methods provided hereby. Generally speaking, they are formed by free-radical polymerization of the vinyl aromatic monomer in the presence of the rubbery polymers as by employing bulk, solution suspension, or emulsion polymerization techniques.

The compositions resulting from such polymerization are referred to in the art as interpolymers, as may be seen from the aforementioned Amos et al U.S. Pat. No., 2,694,692 and Porter U.S. Pat. No., 3,485,894.

The vinyl aromatic monomers employed in this invention include styrene and its derivatives such as halostyrene, alkyl substituted styrenes, aryl substituted styrenes, vinyl derivatives of naphthalene, and the like. Specific examples of such vinyl aromatic monomers include vinyl toluene, bromo styrenes, phenyl styrenes, vinyl naphthalenes, chlorovinyl naphthalenes, and vinyl phenathrenes. Alpha-substituted vinyl aromatic compounds can also be utilized, expecially in combination with the polymerizable vinyl aromatic compounds having no alpha substituent.

The rubbery polymers which may be employed in this invention in conjunction with the high cis content, low vinyl content 1,4-polybutadiene as hereinabove defined include natural rubber and synthetic unsaturated rubbery polymeric derivatives of conjugated 4–6 carbon atom diolefins, for example, rubbery copolymers such as butadiene and styrene, acrylonitrile and butadiene, isoprene and styrene, acrylonitrile and isoprene and 2,3-dimethyl butadiene and styrene copolymers, polyisoprene, polychloroprene, etc.

1,4-polybutadiene having such high cis content and low vinyl content can be prepared by the use of heterogeneous catalysts, such as a chromium compound absorbed on alumina and silica, aluminum tri-alkyl with a metal halide such as a titanium chloride, titanium iodide, and the like halides, organolithium, etc. The particular method of forming the 1,4-polybutadiene can vary so long as it suitably provides 1,4-polybutadienes having cis content of at least 25 percent and vinyl content of not more than about 10 percent. Such polymerizations are normally carried out in a hydrocarbon medium. Typical high cis content, low vinyl content stereoregular 1,4-polybutadienes utilized in this invention comprise about 25 to 95 percent and beyond to 100 percent cis content, about 0–70 percent trans content and not more than about 10 percent vinyl content.

In addition to the required minimum content of 1 percent high cis 1,4-polybutadienes having low vinyl contents, the remainder of rubbery content can be under this invention another rubbery polymer such as natural rubber, synthetic unsaturated rubbery polymeric derivatives of the conjugated 4–6 carbon atom diolefins or mixtures thereof.

In the following examples comparative data are shown for varying amounts of vinyl aromatic monomers and rubbery polymers. It will be noted that where an equivalent amount of high cis content, low vinyl content polybutadiene is substituted for conventional rubbery butadiene-styrene copolymer or emulsion polybutadiene, the impact strengths of the resultant products are greatly increased and that where intermediate amounts are employed, an intermediate increase in impact strength results.

other advantages besides enhanced impact values at various temperatures have been surprisingly observed for the impact polymer compositions provided hereby. For example, objects have been molded from the compositions having improved surfaces, e.g., both as to smoothness and gloss. It has been observed that parts can be provided using these impact compositions which show significant enhancement of heat distortion temperatures, creep rupture and yield times and flex modulus values, without sacrifice in impact values. Another observation, as shown by Example 26 hereof, has been that the impact compositions provided by this invention have demonstrated greatly reduced retentivity of water, as in the case where the final polymer compositions are provided in the form of beads or granules by aqueous suspension polymerization. This lower retentivity of water property is important since the retained water must be at a very low level prior to actual molding of useable objects therefrom.

Small particles of the polymer compositions provided hereby can be rendered expandable by incorporation therein of an amount of a liquid blowing agent having a boiling point in the range of about 10° to 100° C. Desirably, about 2 to 10 percent of the blowing agent depending on the polymer, blowing agent, etc., can be employed. The blowing agent can be incorporated by known methods, such as by impregnation of the particles or by polymerization in the presence of the blowing agent, in order to provide expandable particles of the polymer compositions with the blowing agent evenly distributed through the particles. The blowing agent is desirably an aliphatic hydrocarbon such as pentane, cyclopentane, heptane, petroleum ether, and the like. The blowing agent can be selected from other hydrocarbons such as lower halogenated hydrocarbons, for example, methylene chloride, halogen substituted ethanes, etc. The expandable particles can be formed into foam articles by known procedures such as closed molding procedures.

In the following examples, parts are recited as parts by weight of the total polymer composition and viscosities are recited for 8 percent weight solutions of the final compositions in toluene at 25° C.

EXAMPLE 1

In a suitable vessel 117.6 parts of a rubbery copolymer of butadiene and styrene (SBR rubber) are added with stirring to 1818.9 parts of styrene monomer. The solution is agitated until a homogeneous mixture is formed. Dissolved in 40 parts by weight of styrene monomer, are 1.2 parts of benzoyl peroxide and 0.16 parts by weight of mercaptan modifier, which is added to the homogeneous mixture. After these ingredients are dispersed, the agitation is continued but the temperature is raised to and maintained at 80° C for four hours. The temperature is then lowered to and is maintained at 75° C for an additional three hours. The reaction mass is removed from the mixing vessel and is placed in a closed container for 17 hours at 100° C and 17 hours at 150° C. Five parts by weight of stearic acid and two parts of alkylated aryl phosphite are evenly blended into the above mixture, a graft SBR-rubbery polymer-styrene interpolymer. Rubber content of the interpolymer is 5.93 percent.

EXAMPLE 2

A rubbery copolymer of butadiene-styrene (GR-S) in an amount of 58.8 parts by weight, 58.8 parts by weight of a 1,4-polybutadiene of approximately 80 percent cis content, 8 percent trans-polymer content, 5 percent vinyl content and 23.5 parts by weight of polystyrene fines are blended at room temperature until a homogeneous mixture is formed. Then, while continuing agitation, 1818.9 parts by weight of styrene monomer are added until a uniform mixture is obtained. With continued agitation, identical amounts of the same ingredients as added to the homogeneous monomer mixture in Example 1 hereof, are added under the same conditions and the mass is further treated as in Example 1. Rubber content of the interpolymer is 5.84 percent.

EXAMPLE 3

This example is identical with Example 1 except that 117.6 parts by weight of the high cis 1,4-polybutadiene described in Example 2 are substituted for the GR-S rubber employed in Example 1. The product is a graft polybutadiene-styrene interpolymer having a rubber content of 5.84 percent.

EXAMPLE 4

This example is identical to Example 1 except that 40 parts of the high cis 1,4-polybutadiene described in Example 2 are substituted for the GR-S rubber employed in Example 1. Rubber content of the interpolymer is 2.1 percent.

EXAMPLE 5

This example is identical to Example 1 except that 208 parts of the high cis 1,4-polybutadiene described in Example 2 are substituted for the GR-S rubber employed in Example 1. Rubber content of the interpolymer is 10.1 percent.

The physical properties of the resultant interpolymers of the above five examples are compared as follows:

|  | Ex. 1 | Ex. 2 | Ex. 3 | Ex. 4 | Ex. 5 |
|---|---|---|---|---|---|
| Volatility(%) | 0.30 | 0.78 | 0.40 | 0.20 | 1.40 |
| Viscosity(8% sol.) | 36.0 | 100. | 21.1 | 15.0 | 100. |
| Impact strength* | 0.88 | 1.20 | 1.63 | 0.70 | 2.56 |
| % gel | 4.76 | 8.51 | 1.81 | 1.30 | 7.10 |
| Heat Distortion (°C at 264 p.s.i.) ½ × ¼" bars | 78.5 | 75.0 | 78.0 | 83.0 | 72.5 |
| Mold Diagram Temp. (°F at 400 p.s.i.) | 700. | 700. | 700. | 620. | 700. |

*The standard Izod test (ASTM D 256–56) is employed in all the examples using ½" × ¼" injection molded bars, unless otherwise noted, the results being in ft.-lbs./inch of notch.

EXAMPLE 6

Into a suitable reaction vessel at room temperature are added with stirring 121.8 parts of a rubbery copolymer of butadiene and styrene (having a butadiene to styrene ratio of approximately 76.5 to 23.5) and 1840.5 parts of styrene monomer. The solution is agitated until a homogeneous mixture was formed. 1.1 parts of lauroyl peroxide and 0.6 parts by weight of mercaptan modifier are dissolved in 40 parts of styrene monomer and are added to the homogeneous mixture. After these ingredients are dispersed the agitation is continued but the temperature is raised to 81° C for 4 hours. The temperature is then lowered to 75° C and is maintained for an additional 3 hours. The reaction mass is removed from the reaction vessel and is placed in a suitable closed container for 17 hours at 100° C and is then heated for 17 hours at 150° C. 5 parts of stearic acid and 2 parts of alkylated aryl phosphite are intimately added to the above mixture. Rubber content of the interpolymer is 6.06 percent.

EXAMPLE 7

Example 6 is repeated employing 121.8 parts of standard emulsion low cis content polybutadiene (cis content 8 percent, trans 74 percent, vinyl 18 percent) in place of the butadiene-styrene rubbery copolymer. Rubber content of the interpolymer is 6.06 percent.

EXAMPLE 8

Example 6 is repeated employing 121.8 parts of a steroregular 1,4-polybutadiene containing 34 percent cis content and 9 percent vinyl content in place of the butadiene-styrene copolymer. Rubber content of the interpolymer is 6.06 percent.

EXAMPLE 9

Example 6 is repeated employing 121.8 parts of 1,4-polybutadiene containing 95 percent cis content and 3.3 percent vinyl content in place of the butadiene styrene rubbery copolymer. Rubber content of the interpolymer is 6.06 percent.

The physical properties of the resultant interpolymers of Examples 6–9 are compared as follows:

|  | Ex. 6 | Ex. 7 | Ex. 8 | Ex. 9 |
|---|---|---|---|---|
| Impact (Izod) | 0.90 | 0.70 | 1.60 | 1.88 |
| Heat Distortion (°C at 264 p.s.i.) ½" × ¼" bars | 66.0 | 74.0 | 70.0 | 70.0 |
| % Volatility | 1.39 | 0.20 | Not determined | 1.57 |
| Viscosity (cps) | 16.3 | 19.2 | 21.6 | 17.3 |

In Examples 10–12, Example 6 is repeated employing the following materials in the amounts indicated in the following table of physical properties in place of the rubbery polymer and styrene monomer employed therein. Rubber contents of the interpolymers are 5.2 percent, 5.1 percent and 4.4 percent, respectively.

|  | Example 10 | Example 11 | Example 12 |
|---|---|---|---|
| Parts butadiene-styrene copolymer | 250.0 | 184.7 | 119.3 |
| Parts 1,4-polybutadiene 95% cis content and 3.3% vinyl content | 0. | 50.0 | 100.0 |
| Parts styrene monomer | 4588.1 | 4603.4 | 4618.8 |
| Impact(½" × ⅛" bars) | 0.80 | 0.93 | 1.1 |
| Viscosity (cps) | 16.1 | 20.2 | 20.5 |
| Volatility (%) | 1.78 | 1.59 | 0.55 |
| Heat Distortion (°C at 264 p.s.i.) ½" × ¼" bars | 66.0 | 74.0 | 74.5 |
| Elastic Mod. × $10^5$ (p.s.i.) | 3.80 | 4.0 | 3.91 |
| Elongation at fail*-(%) | 23.2 | 24.4 | 17.4 |
| Tensile at fail*-(p.s.i.) | 3555.0 | 4822.0 | 4941.0 |
| Elongation at yield*-(%) | 1.43 | 2.04 | 2.16 |
| Tensile at yield*-(p.s.i.) | 4326.0 | 4799.0 | 4997.0 |

*Employed essentially ASTM D 638 procedure.

EXAMPLE 13

Example 6 is repeated employing 190.0 parts of 1,4-polybutadiene having 95 percent cis content and 3.3 percent vinyl content and 4683.1 parts of styrene monomer in place of the rubbery polymer and styrene employed therein. Rubber content of the interpolymer is 4 percent.

EXAMPLE 14

Example 6 is repeated employing 247.5 parts of 1,4-polybutadiene having 99 percent cis content and 0.8 percent vinyl content and 4585.6 parts of styrene monomer in place of the rubbery polymer and styrene employed therein. Rubber content of the interpolymer is 5.1 percent.

The following table lists the physical properties of the interpolymers of Examples 13 and 14:

|  | Example 13 | Example 14 |
|---|---|---|
| Viscosity (cps) | 13.0 | 17.0 |
| Volatility (%) | 1.08 | 1.22 |
| Impact (Izod) | 1.20 | 1.40 |
| Heat Distortion | 70.0 | 69.5 |
| (° C at 264 p.s.i.) |  |  |
| ½" × ¼" bars |  |  |
| Tensile at yield (p.s.i.) | 3847.0 | 3796.0 |
| Elongation at yield (%) | 1.78 | 1.93 |
| Tensile at fail (p.s.i.) | 3811.0 | 3689.0 |
| Tensile Mod. × 10⁵ (p.s.i.) | 3.57 | 3.10 |

EXAMPLE 22

The procedure of Example 3 is repeated using the following components in the polymerization:
  Component I - 94.25 parts of styrene monomer.
  Component II - 5.75 parts of "rubbery material."

The 5.75 parts of "rubbery material," Component II, is made up of a combination of the following: 0–100 percent of A - consists of a stereoregular 1,4-polybutadiene having 96 percent cis, 1 percent trans and 3 percent vinyl content, and the remainder of Component II is made up of B - a butadiene-styrene copolymer of the "GR-S type," which is an emulsion polymerization product having 22–24 percent styrene, sold as Goodyear 1006.

The interpolymers are evaluated for Izod impace employing American Standards for Testing Materials, Test D 256-56. The test specimens are prepared following the procedure of ASTM Test D 1892 - 61T by the compression molding procedure, as directed therein under Section 4.

The runs of the experiment and the evaluation of the interpolymers thereof, having rubber contents of 5.75 percent, including impact strengths are set forth in the following table:

| Run Number | Composition of Component II (Rubbery Material) | | Viscosity (cps) | Impact Strength (ft.-lbs./in. notch) |
|---|---|---|---|---|
|  | %A | %B |  |  |
| I(control) | — | 100 | 23.4 | 1.13 |
| II | 20 | 80 | 25.7 | 1.52 |
| III | 40 | 60 | 24.9 | 1.73 |
| IV | 60 | 40 | 21.8 | 1.81 |
| V | 80 | 20 | 20.9 | 1.56 |
| VI | 100 | — | 17.8 | 1.44 |

The above experiment is repeated using again a 5.75 percent total rubbery material concentration (Component II). The tensile values of the interpolymers are determined on injection molded specimens (ASTM D 1892-61T). The Runs of the experiment and the evaluation of the products are summarized in the following table:

| Run No. | Rubber Component Employed | | Elongation at Fail (%) | Tensile at Fail (psi) |
|---|---|---|---|---|
|  | %A | %B |  |  |
| I | — | 100 | 35.7 | 4423 |
| II | 25 | 75 | 41.0 | 4245 |
| III | 50 | 50 | 48.9 | 4083 |
| IV | 100 | — | 54.3 | 3623 |

EXAMPLE 23

The process of Example 3 is again employed. In the Runs of the experiment (Runs I–IV), the following rubbery components are employed to provide a total rubber concentration of 5.75 percent, based on the total interpolymer:

Run I (control) - 5.75 percent of the GR-S-type rubber product Goodyear 1006 is employed Run II - 5.75 percent of a rubber consisting of an emulsiontype polybutadiene sold under the designation Goodyear 5000 is employed. This polymer has a vinyl content of 17 percent and a cis content of 17.8 percent (greatly in excess of 10 percent).

Run III - 5.75 percent of a stereoregulated 1,4-polybutadiene is employed having a vinyl content of 7.8 percent and a cis content of 35.9 percent. It is seen that this polybutadiene has a greater than 25% cis content but a less than 10% vinyl content. This product is sold under the designation Diene 35 NF.

Run IV - 5.75 percent of a stereoregular 1,4-polybutadiene is employed having a cis content of 95.4 percent and a vinyl content of 2.7 percent. This product is sold under the designation ASRC Cisdene.

The Runs and the evaluation results are listed in the following table:

| Run No. | Rubber Component Employed | | Viscosity (cps) | Impact Strength (ft.-lbs./in.-notch) |
|---|---|---|---|---|
|  | cis% | vinyl% |  |  |
| I(control) | GR-S-type rubber (22–24% styrene) | | 27.3 | 1.35 |
| II | 17.8 | 17.0 | 25.7 | 1.35 |
| III | 35.9 | 7.8 | 24.3 | 1.96 |
| IV | 95.4 | 2.7 | 26.7 | 2.02 |

EXAMPLE 24

Into a suitable reaction vessel are added 121.8 parts of 95 percent cis content, 2 percent vinyl content 1,4-polybutadiene, 1840.5 parts of styrene monomer, 4 parts of a conventional plasticizer and 3 parts of a conventional antioxidant. The reaction mass is polymerized with agitation at 95° C for 10 hours. The reaction mass is removed from the mixing vessel and placed in a closed container for 17 hours at 100° C and 17 hours at 150° C.

The rubber interpolymer having a rubber content of 6.2% had the following properties:

| | |
|---|---|
| Impact (Izod) | 1.77 |
| Heat Dist. (°C at 264 p.s.i. ½ × ¼" bars) | 69.5 |
| Viscosity (cps) | 19.3 |
| Volatility (%) | 0.90 |

EXAMPLE 25

Quantities of small particles of the high impact interpolymers of this invention provided by the above examples are impregnated with n-pentane by tumbling therewith 7 parts of n-pentane per 100 parts of polymer in a pressurized vessel for several hours to obtain an even distribution of the blowing agent throughout the polymer particles.

EXAMPLE 26

The impact interpolymers of this Example in the form of polymer beads are provided by the following procedure: six parts of rubber are dissolved in 94 parts styrene at a temperature of about 100° C and the mixture is polymerized at about 100° C until the polymer content of the polymerization mixture reaches a value of at least 35 to about 50 percent by weight. The polymerization mixture is then suspended in about equal parts by weight of an aqueous suspension polymerization medium containing a small amount of polyvinyl alcohol. Suspension polymerization is carried out using peroxide catalyst at suitable temperatures of at least 110° C until the polymerization is completed. The final interpolymer present in the form of polymer beads is separated by centrifugation.

Volatility content (being mostly water) of the centrifuged polymer bead product produced by this procedure using SB-R rubber (Goodyear 1006) is approximately 500 percent that of polymer beads coming within the present invention using as the rubbery polymer a stereoregular polybutadiene having about 98 percent cis content and about 1 percent vinyl content.

Other compounding ingredients such as conventional anti-oxidants and plasticizers may be incorporated into the compositions of this invention. Thus, up to 2 percent by weight based on the weight of the polymer composition may be used of an anti-oxidant to prevent possible degradation of the rubbery material. Examples of such anti-oxidants include 2,6-di-tert-butyl-4-methyl phenol and alkylated aryl phosphites. A plasticizer in an amount up to about 5 percent by weight, as for example butyl stearate, may be similarly used to impart desirable flow and molding properties to the finished product.

Catalysts that may be used are the free radical polymerization catalysts commonly used in ordinary styrene polymerizations. Example of these include tertiary butyl peracetate, tertiary butyl perbenzoate, di-t-butyl peroxide, 2,4-dichloro benzoyl peroxide, p-chlorobenzoyl peroxide, acetyl peroxide, caprylyl peroxide, methyl ethyl ketone peroxide, hydroxyheptyl peroxide, 2-azo-bis-isobutyronitrile and lauroyl peroxide. Minimum concentrations of catalysts are preferred in practicing this invention. Products of highest clarity are obtained when the monomer polymerizes thermally in the presence of rubber in the absence of catalysts. However, some monomers and some rubbers often contain traces of inhibitors which interfere with thermal polymerization and therefore small quantities of catalysts can be incorporated in the formulation to overcome the effect of these inhibitors.

Normal polymerization conditions may be employed in the practice of this invention. Thus, as is often preferred, each polymerization stage can be carried out under a blanket of nitrogen. The times and temperatures of polymerization may vary and are governed by the properties desired in the finished product. For example, each batch of monomer may be polymerized at one particular temperature or may be polymerized in various selected temperature stages. In general, since the polymerization is exothermic, the rate of polymerization is restricted by the rate the heat can be removed from the polymerizing mass so that the nature and particular design of the equipment used as well as the desired properties of the final impact polymer compositions influences the time-temperature conditions selected to employ in a polymerization.

Many changes and alterations may be made without departing from the spirit and scope of this invention, as set forth in the appended claims.

The compositions prepared in accordance with the present invention comprise two phases, a first which is a continuous phase of polymerized vinyl aromatic monomer and a second which is primarily a discontinuous phase of a graft copolymer of the vinyl aromatic monomer and rubbery polymer. The second discontinuous phase is substantially insoluble in solvents (e.g. toluene) which are conventional solvents for vinyl aromatic polymers and polybutadiene at room temperature. As used here, "insolubility" is determined as follows:

One half gram of the composition of the present invention (in conventional pellet form) is placed in 10 ml of toluene and the mixture is agitated until the continuous phase dissolves (the geometric form of the pellets disappears), agitation overnight usually being sufficient. This mixture is then centrifuged for 60 minutes at 18,000 rpm. The presence of a centrifugate having a polybutadiene component indicates the presence of an insoluble phase in the composition.

We claim:

1. A moldable composition, having improved impact value, comprising a graft interpolymer of styrene and from about 1 to 20 percent of a rubbery, 1,4-polybutadiene, based on the total composition weight, said amount of polybutadiene being effective in substantially improving the impact value in said composition, said 1,4-polybutadiene characterized by having a cis butadiene content of at least 25 percent and a 1,2-addition content of not more than about 10 percent based on the weight of said 1,4-polybutadiene, said composition prepared by polymerizing under free radical polymerization conditions, with agitation, a homogeneous mixture comprising said styrene and said polybutadiene to provide a dispersed and substantially uniform composition, said composition containing a continuous phase which is polymerized styrene and a discontinuous phase which is a graft copolymer of 1,4-polybutadiene and styrene, said discontinuous phase being substantially insoluble in toluene at room temperature.

2. The composition of claim 1 which is prepared by solution polymerization.

3. The composition of claim 1 wherein the 1,4-polybutadiene employed has a minor percentage greater than 25 percent of cis butadiene content and a 1,2-addition butadiene content of less than about 10 percent.

4. The composition of claim 3 wherein the 1,4-polybutadiene has a cis butadiene content of about 35 percent.

5. The composition of claim 1 wherein the 1,4-polybutadiene employed has a content of cis butadiene units up to about 95% and a low amount of 1,2-addition butadiene content which is less than about 10 percent.

6. The composition of claim 5 wherein the 1,4 polybutadiene employed has a cis butadiene content of about 95 percent.

7. The composition of claim 1 wherein said polybutadiene is present in an amount of from 1 to about 10 percent by weight.

8. The composition of claim 7 wherein said polybutadiene is percent in an amount of at least about 5 percent by weight.

9. The composition of claim 3 wherein said polybutadiene is present in an amount of from 1 to about 10 percent by weight.

10. The composition of claim 9 wherein said polybutadiene is present in an amount of at least about 5 percent by weight.

11. The composition of claim 5 wherein said polybutadiene is present in amount of from 1 to about 10 percent by weight.

12. The composition of claim 11 wherein said polybutadiene is present in an amount of an least about 5 percent by weight.

13. A moldable vinyl aromatic polymer composition of improved impact value comprising a graft copolymer of polymerized vinyl aromatic monomer and a rubbery, 1,4-polybutadiene polymer, said rubbery 1,4-polybutadiene being present in an amount of from about 1 to 20 percent by weight of the composition, said amount of polybutadiene being effective in substantially improving the impact value of said composition, said polybutadiene further characterized by having a cis butadiene content of at least 25 percent and a 1,2-addition content of not more than about 10% based on the weight of said 1,4-polybutadiene, said composition being prepared by polymerizing under free radical polymerization conditions, with agitation, a homogeneous mixture comprising said vinyl aromatic monomer and said 1,4-polybutadiene, to provide a dispersed and substantially uniform composition, said composition comprising a continuous phase of polymerized vinyl aromatic monomer and a discontinuous phase which is a graft copolymer of 1,4-polybutadiene and vinyl aromatic monomer, said discontinuous phase being substantially insoluble in toluene at room temperature.

14. The composition of claim 13 wherein the vinyl aromatic monomer is styrene.

15. A moldable styrene polymer composition having improved impact value, formed by the polymerization of styrene monomer having rubbery, 1,4-polybutadiene homogeneously dispersed therein, said polymerization being carried out under free radical polymerization conditions until the polymerization of said styrene monomer is substantially completed and being carried out under agitation conditions to provide a dispersed and substantially uniform composition, said 1,4-polybutadiene being present in an amount of from 1% to about 20% based on the total final polymer composition weight, said amount of polybutadiene being effective in substantially improving the impact value of said composition, said polybutadiene being characterized by having a cis butadiene content of at least about 25 percent and a 1,2-addition butadiene content of not more than about 10 percent, based on the weight of said polybutadiene.

16. The moldable styrene polymer composition of claim 15 which is prepared by solution polymerization techniques.

17. The composition of claim 15 wherein the 1,4-polybutadiene employed has a minor percentage greater than 25 percent of cis butadiene content and a 1,2-addition butadiene content of less than about 10 percent.

18. The composition of claim 17 wherein the 1,4-polybutadiene has a cis butadiene content of about 35 percent.

19. The composition of claim 15 wherein the 1,4-polybutadiene employed has a content of cis butadiene units up to about 95 percent and a low amount of 1,2-addition butadiene content which is less than about 10 percent.

20. The composition of claim 19 wherein the 1,4-polybutadiene employed has a cis butadiene content of about 95 percent.

21. The composition of claim 15 wherein said polybutadiene is present in an amount of from 1 to about 10 percent by weight.

22. The composition of claim 21 wherein said polybutadiene is present in an amount of at least about 5 percent by weight.

23. The composition of claim 17 wherein said polybutadiene is present in an amount of from 1 to about 10 percent by weight.

24. The composition of claim 23 wherein said polybutadiene is present in an amount of at least about 5 percent by weight.

25. The composition of claim 19 wherein said polybutadiene is present in an amount of from 1 to about 10 percent by weight.

26. The composition of claim 25 wherein said polybutadiene is present in an amount of from at least about 5 percent by weight.

27. The composition of claim 15 comprising a continuous phase which is polymerized styrene and a discontinuous phase which is a graft copolymer 1,4-polybutadiene and styrene.

* * * * *